United States Patent [19]
Jantz

[11] Patent Number: 5,867,736
[45] Date of Patent: Feb. 2, 1999

[54] METHODS FOR SIMPLIFIED INTEGRATION OF HOST BASED STORAGE ARRAY CONTROL FUNCTIONS USING READ AND WRITE OPERATIONS ON A STORAGE ARRAY CONTROL PORT

[75] Inventor: Ray M. Jantz, Wichita, Kans.

[73] Assignee: LSI Logic Corporation, Milpitas, Calif.

[21] Appl. No.: 624,235

[22] Filed: Mar. 29, 1996

[51] Int. Cl.$^6$ ...................................................... G06F 13/10
[52] U.S. Cl. ........................................... 395/894; 395/828
[58] Field of Search ...................... 365/189.03; 370/216; 395/872, 182.03, 182.05, 500; 707/200, 201

[56] References Cited

U.S. PATENT DOCUMENTS

| | | | |
|---|---|---|---|
| 5,148,432 | 9/1992 | Gordon et al. | 395/182.05 |
| 5,150,328 | 9/1992 | Aichelmann, Jr. | 365/189.03 |
| 5,214,760 | 5/1993 | Hammond et al. | 395/872 |
| 5,237,689 | 8/1993 | Behnke | 395/651 |
| 5,257,391 | 10/1993 | DuLac et al. | 395/830 |
| 5,333,277 | 7/1994 | Searls | 395/281 |
| 5,345,565 | 9/1994 | Jibbe et al. | 395/310 |
| 5,402,428 | 3/1995 | Kakuta et al. | 395/182.07 |
| 5,404,487 | 4/1995 | Murata et al. | 711/113 |
| 5,418,925 | 5/1995 | DeMoss et al. | 711/114 |
| 5,448,719 | 9/1995 | Schultz et al. | 395/182.03 |
| 5,479,653 | 12/1995 | Jones | 395/182.03 |
| 5,574,851 | 11/1996 | Rathunde | 395/182.05 |
| 5,619,690 | 4/1997 | Matsumani et al. | 707/200 |
| 5,661,719 | 8/1997 | Townsend et al. | 370/216 |
| 5,689,706 | 11/1997 | Rao et al. | 707/201 |
| 5,694,581 | 12/1997 | Cheng | 395/500 |

OTHER PUBLICATIONS

David A. Patterson, Garth Gibson and Randy H. Kantz; A Case for Redundant Arrays of Inexpensive Disks (RAID); Dec. 1987; Report No. UCB/CSD 87/391.

*Primary Examiner*—Thomas C. Lee
*Assistant Examiner*—Chien Yuan
*Attorney, Agent, or Firm*—Daniel N. Fishman; Wayne P. Bailey

[57] ABSTRACT

Methods operable in a SCSI RAID subsystem to enable improved portability in host based RAID management programs. RAID management programs which provide an administrative user interface for managing the operation and configuration of a RAID subsystem have traditionally communicated with the RAID system using control function calls (ioctl) through the operating system's device driver. Ioctl function calls are notoriously non-standardized among different operating systems and even among different versions of certain operating systems. The methods of the present invention are operable within a RAID subsystem to enable use of standardized read and write system function calls to the device driver for communication with a control port within the RAID subsystem. A special LUN is reserved for such read and write administrative calls. The special control port LUN processes the read and write calls to perform the desired RAID management functions on behalf of the management program on an attached host computer. Tag field values are used as logical block numbers in the read and write commands directed to the control port LUN to identify which of several management programs issued the command. The control port LUN within the SCSI RAID subsystem enables the host management program to utilize standardized read and write system function calls. Use of these standardized system function calls significantly enhances the portability of RAID management programs between a plurality of computing environments.

30 Claims, 5 Drawing Sheets

METHODS FOR SIMPLIFIED INTEGRATION OF HOST BASED STORAGE ARRAY CONTROL FUNCTIONS USING READ AND WRITE OPERATIONS ON A STORAGE ARRAY CONTROL PORT

BACKGROUND OF THE INVENTION

1. Field of the Invention

The invention relates generally to control methods operable within a disk array subsystem (RAID) and in particular to methods operable within a disk array subsystem to simplify host computer RAID management and control software integration.

2. Background of the Invention

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures is automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks (RAID)*, reviews the fundamental concepts of RAID technology.

There are five "levels" of standard geometries defined in the Patterson publication. The simplest array, a RAID level 1 system, comprises one or more disks for storing data and an equal number of additional "mirror" disks for storing copies of the information written to the data disks. The remaining RAID levels, identified as RAID level 2,3,4 and 5 systems, segment the data into portions for storage across several data disks. One of more additional disks are utilized to store error check or parity information.

RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

To further improve reliability, it is known in the art to provide redundant control modules to reduce the failure rate of the subsystem due to control electronics failures. In some redundant architectures, pairs of control modules are configured such that they control the same physical array of disk drives. A cache memory module is associated with each of the redundant pair of control modules. The redundant control modules communicate with one another to assure that the cache modules are synchronized. In prior designs, the redundant pair of control modules would communicate at their power-on initialization (or after a reset operation). While the redundant control modules completed their communications to assure synchronization of the cache modules, the RAID storage subsystem would be unavailable with respect to completing host computer requests. If the cache modules were found to be "out of sync" the time required to restore synchronization could be significant. In addition, a failure of one of the redundant pair of control modules would further extend the time during which the RAID storage subsystem would be unavailable. Manual (operator) intervention could be required to replace a detective redundant control module in order for the RAID subsystem to begin processing of host computer requests.

Control and administrative functions to manage the various geometries and configuration options of such RAID subsystems are often embodied in programs operable in host computer systems attached to the RAID subsystem. Such host computer programs communicate with the RAID subsystem via standard I/O functions provided by the underlying subsystem. Standard I/O read and write operations are typically used to exchange data with the storage array subsystem. I/O control functions are most frequently used to control and administer the subsystem geometries and configuration parameters. I/O control function calls provide an "out of band" communication channel to the storage array subsystem to clearly distinguish the data exchange functions from the I/O control administration functions.

Use of "standard" I/O control functions raises problems in the portability of the administrative programs operable on attached host computer systems. I/O control functions in operating systems are not well standardized. There exists significant variability between operating systems as to the features available in, and the restrictions imposed on, the I/O control functions. As applied, for example, to the administration of SCSI storage array devices, I/O control functions (e.g., ioctl) in some systems are incapable of returning SCSI sense data from the device while other systems can return such sense data. Some systems impose restrictions on I/O control function calls such as the inability to utilize the function call in a multi-threaded (multi-tasking) manner in conjunction with a single storage array device. Or, for example, other system may preclude use of I/O control functions in conjunction with other standard file oriented I/O function calls. Additionally, perhaps due in part to the lack of standardization, I/O control functions tend to be less thoroughly tested by systems vendors than other I/O related library functions.

In view of the above it is clear that a need exists for an improved method for communicating administrative information and configuration parameters to a storage array subsystem. In particular, a need exists for methods operable within a RAID storage system which serve to simplify and standardize the host based computer programs which manage attached RAID subsystems.

SUMMARY OF THE INVENTION

The present invention solves the above and other problems, and thereby advances the useful arts, by providing methods and associated apparatus which simplify the structure of, and enhance the portability of, host based computer programs which administer and manage configuration information in attached RAID subsystems. In particular, the methods of the present invention are operable within the RAID storage subsystem to provide an interface for host based management programs which depends upon standardized read and write is I/O function calls. Read and write I/O function calls are far more standardized and portable among computer systems than are I/O control (ioctl) functions commonly supported in prior RAID storage subsystems. Use of standardized read and write I/O function calls as supported by the methods of the present invention simplifies the task of porting RAID management programs between a variety of host computer systems.

In particular, the methods of the present invention provide support within the RAID subsystem for use of standard read and write function calls by an attached host computer system to pass arbitrary control related parameters and commands. RAID management programs operable on attached host computer systems therefore utilize standardized read and write I/O interface function calls to thereby enhance the portability of the programs between heterogeneous computing systems. A special logical unit number (also referred to as LUN or control port LUN) is defined as the control port within the RAID subsystem by the methods of the present invention. The control port LUN is not associated with any physical storage of the disk array. However, the control port LUN responds in all respects as though it is associated with storage space for purposes of responding to the host computer system device driver. All standardized functions of the operating system device driver are therefore operable in conjunction with the control port LUN in the RAID subsystem under control of the methods of the present invention. This assures that standard operating system and driver initialization sequences will be supported and appropriate responses generated to allow completion of system startup.

Write I/O function calls directed to the control port LUN provide arbitrary SCSI command blocks to the control port. The arbitrary command blocks are embedded within the data portion of the host generated write command. Read I/O function calls directed to the control port LUN are used by the RAID management host computer programs to retrieve data associated with the administrative command or to read SCSI sense data returned from the RAID subsystem. Exemplary of such command blocks generated by a RAID management program are commands to reconfigure the RAID geometry or commands to restore the contents of replacement (spare) disk drive.

The control port LUN defined by the methods of the present invention appears to host computer systems as an essentially normal LUN that never fails due to failure of the underlying storage medium (since there is no physical underlying storage media). The control port LUN is always "open-able" by RAID management host computer systems regardless of the status of other LUNs (associated with physical storage devices) within the RAID storage subsystem. The methods of the present invention permit multi-threaded operation (unlike prior techniques using non-standardized ioctl function calls). In particular the methods of the present invention utilize a tag ID field added to each host generated command to associate related commands which form portions of a multi-command administrative operation. All commands associated with a particular thread's operation utilize a common tag ID field value. Any returned data or returned sense data generated by operation of the RAID subsystem in response to the tagged command is read by a host computer read request which specifies the same tag ID value as the command block which originated the operation. For example, a reconfiguration related command may be transferred to the control port LUN embedded in the data associated with a first write I/O function call. A second write I/O function call may provide a data buffer with parameters required for the reconfiguration embedded command. Finally a read I/O function call is issued to retrieve the sense data generated by operation of the embedded reconfiguration command on the RAID controller. All three I/O function calls utilize the identical tag ID value to associate the three operations with a single control operation.

Additionally, to avoid misusing the control port LUN as a normal LUN (i.e., one associated with physical storage) or vice versa, a signature block is associated with the control port LUN to permit the RAID management program at the host computer to verify the expected identity of the control port LUN. Only the control port LUN returns the proper signature block values in response to a host computer read request to thereby verify the identity of the control port LUN. Conversely, each read or write command sent to the control port LUN provides the unique signature block data to prevent inadvertent misuse of the control port LUN.

It is therefore an object of the present invention to provide methods operable within a RAID storage subsystem to assist portable host computer RAID management programs.

It is a further object of the present invention to provide methods operable within a RAID storage subsystem to provide read and write command support to assist portable host computer RAID management programs.

It is a further object of the present invention to provide methods operable within a RAID storage subsystem to provide a control port logical unit which supports read and write requests from RAID management programs operable on an attached host computer system.

The above and other objects, aspects, features, and advantages of the present invention will become apparent from the following description and the attached drawing.

DETAILED DESCRIPTION OF THE PREFERRED EMBODIMENT

Figure 1:
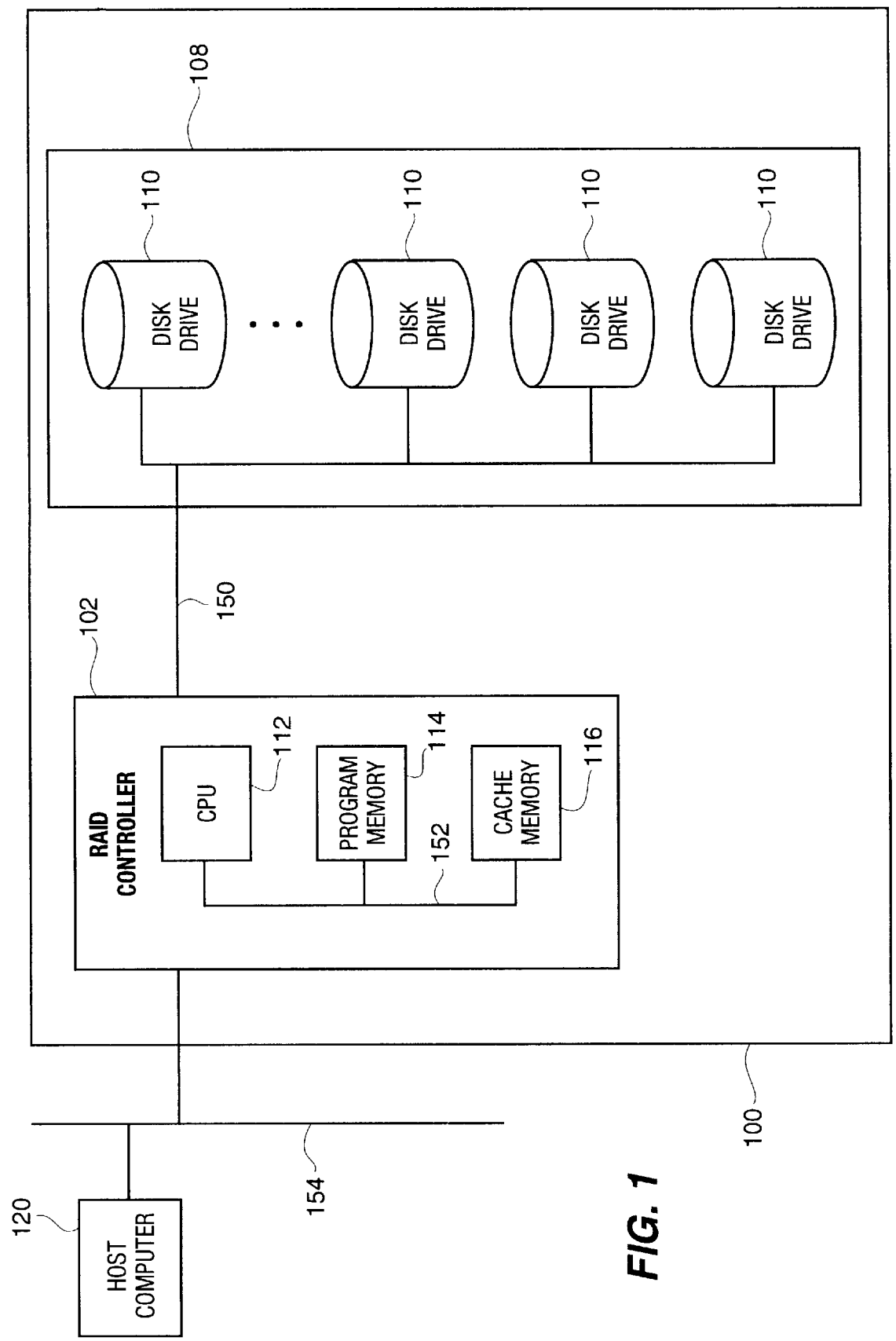
FIG. 1 is a block diagram of a typical RAID storage subsystem in which the structures and methods of the present invention may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

RAID OVERVIEW

FIG. 1 is a block diagram of a typical RAID storage subsystem 100 in which the methods and associated apparatus of the present invention may be applied. RAID storage subsystem 100 includes RAID controller 102 which is in turn connected to disk array 108 via bus (or busses) 150 and to host computer 120 via bus 154. Disk array 108 is comprised of a plurality of disk drives 110. One of ordinary skill in the art will readily recognize that interface bus 150 between RAID controller 102 and disk array 108 (including disk drives 110) may be any of several industry standard interface busses including SCSI, IDE, EIDE, IPI, Fiber Channel, SSA, PCI, etc. Circuits (not shown) within RAID controller 102 appropriate to controlling bus 150 are well known to those of ordinary skill in the art. Interface bus 154 between RAID controller 102 and host computer 120 may be any of several standard industry interface busses including SCSI, Ethernet (LAN), Token Ring (LAN), etc. The methods of the present invention are most beneficially applied to SCSI interface connections between one or more host computer systems and the RAID storage subsystem 100. The concept of logical units (as utilized in the methods of the present invention and discussed in detail below) is native to the SCSI interfacing specifications. Other connectivity standards such as LAN may utilize the methods of the present invention if appropriately translated to corresponding structures and protocols associated therewith.

As shown in FIG. 1, RAID storage subsystem 100 may be applied to implement any of the well known RAID levels (e.g. levels 1–5). The various RAID levels are distinguished by the manner in which RAID controller 102 logically subdivides or partitions the disk drives 110 in disk array 108. For example, when implementing RAID level 1 features, approximately half of the disk drives 110 of disk array 108 are used to store and retrieve data while the other half is operated by RAID controller 102 to mirror the data storage contents of the first half. Further, when implementing RAID level 4 features, RAID controller 102 utilizes a portion of the disk drives 110 in disk array 108 for the storage of data and the remaining disk drives 110 are utilized for the storage of error checking/correcting information (e.g. parity information). As discussed below, the methods and associated apparatus of the present invention may be applied to the RAID storage subsystem 100 in conjunction with any of the standard RAID levels.

RAID controller 102 includes CPU 112, program memory 114 (e.g. ROM/RAM devices for storing program instructions and variables for the operation of CPU 112), and cache memory 116 for storing data and control information related to the data stored in disk array 108. CPU 112, program memory 114, and cache memory 116 are connected via memory bus 152 to enable CPU 112 to store and retrieve information in the memory devices. The methods of the present invention are embodied as programmed instructions and associated data structures stored within program memory 114 and are retrieved by, and operable within, CPU 112. One of ordinary skill in the art will readily recognize that the block diagram of FIG. 1 is intended only as an exemplary design which may embody the present invention.

Many alternate controller and RAID storage subsystem designs may embody the methods and associated apparatus and structures of the present invention.

RAID management computer programs are operable within an attached host computer system to configure and control the operation of the RAID storage subsystem 100. For example, a RAID management program may issue commands to the RAID storage subsystem 100 to configure portions of the disk array 108 to operate according to one RAID level and other portions of the disk array 108 to operate in accordance with another RAID level. Such operational portions of a RAID storage subsystem 100 are often referred to a logical units and identified by an index value called the logical unit number (also referred to herein as LUN). Each LUN within a RAID storage subsystem 100 responds to a host computer system request substantially independent of other LUNs within the RAID subsystem. The RAID management program communicates with the RAID subsystem to perform required administrative tasks outside the bandwidth of the data communications with LUNs corresponding to storage in the disk array 108.

RAID MANAGEMENT SUPPORT—PRIOR ART

Figure 2:
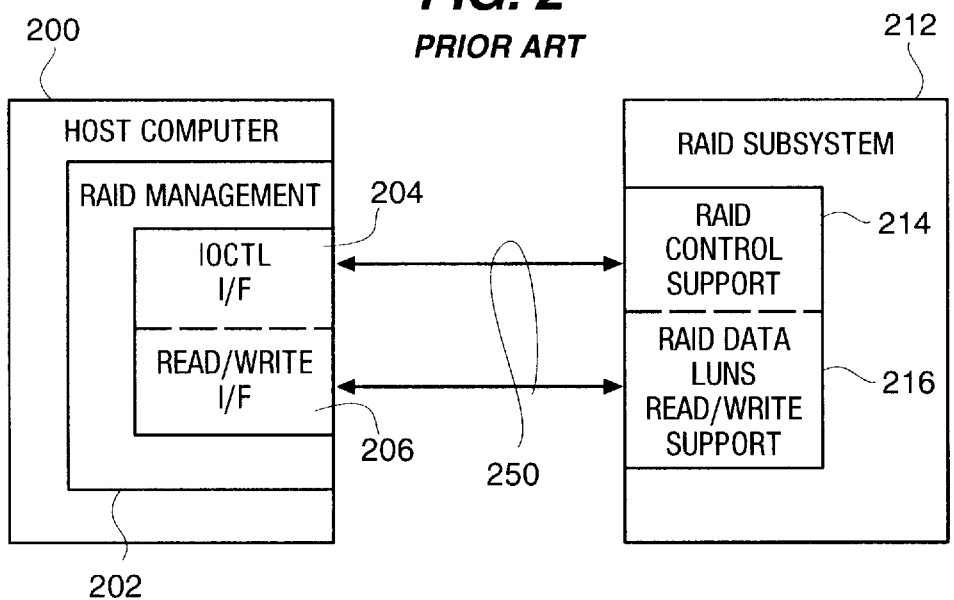
FIG. 2 is a block diagram representative of the structure of RAID management systems and RAID storage subsystems operable in accordance with the techniques known in the prior art.

FIG. 2 is a block diagram which depicts the I/O communications interface between a typical host computer system 200 and a RAID storage subsystem 212 as known in the art. RAID management program 202 is operable within host computer 200 to permit administrative users to interrogate and modify parameters which define and control the operation of the RAID storage subsystem 212. To perform required configuration and control commands, the RAID management program 202 utilizes ioctl interface function calls 204 within the operating system of the host computer 200. Ioctl interface function calls communicate with the RAID storage subsystem 212 via bus 250 (typically a SCSI bus as noted above). A portion of the control programs operable within the controller of the RAID storage subsystem are responsible for supporting and processing the control commands received. RAID control support 214 within the RAID storage subsystem 212 provides that support for administrative control and configuration commands.

Standard read and write interface function calls 206 within the operating system of the host computer 200 are used for exchange of data with the LUNs which represent storage space within the disk array. The read and write interface function calls 206 communicate with the RAID storage subsystem 212 via bus 250 (typically a SCSI bus as noted above). The RAID data LUNs read and write support 216 portion of the RAID controller programs provides required support to process all data related read and write commands directed to the RAID storage subsystem 212.

As noted above, use of ioctl interface function calls 204 within the RAID management program 202 presents a number of problems when porting the management program to other host computer systems. The ioctl function calls are not well standardized among various computing system nor even among different versions a operating systems within host computer systems.

RAID MANAGEMENT SUPPORT—PRESENT INVENTION

Figure 3:
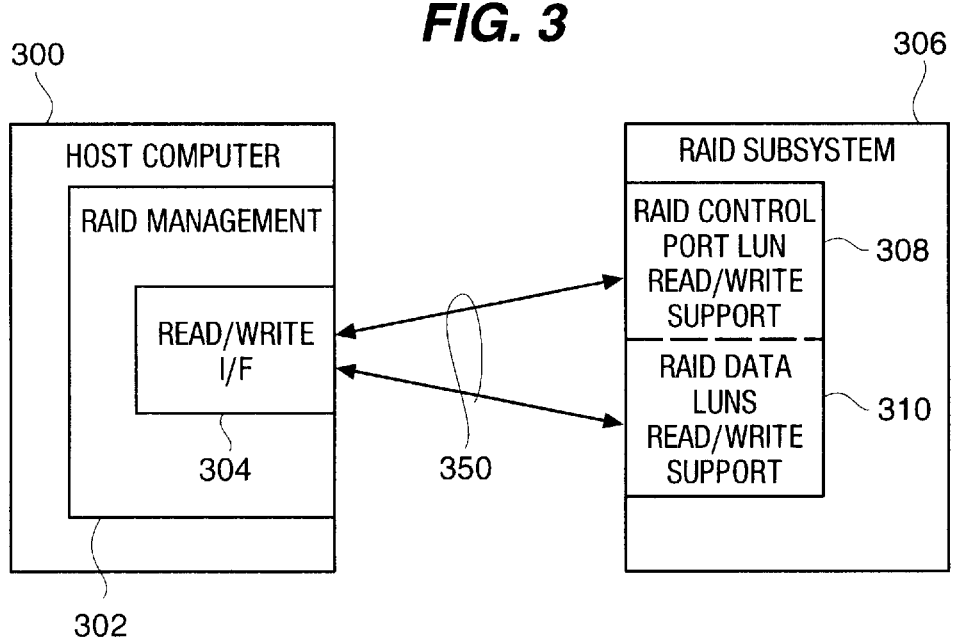
FIG. 3 is a block diagram representative of the structure of RAID management systems and RAID storage subsystems operable in accordance with the methods of the present invention.

FIG. 3 is a block diagram describing the interface between a RAID management program 302 operable on an attached host computer 300 and a RAID storage subsystem 306 operable with the methods of the present invention. RAID management program 302 uses standard read and write interface function calls 304 within the operating system of host computer 300 to interrogate and modify the operating configuration of the RAID storage subsystem 306. Read and write requests generated for purposes of configuring the RAID storage subsystem 306 are directed to a special control port LUN. Conversely, read and write requests for general data storage and retrieval are directed to other LUNs which correspond to storage capacity in the disk array of RAID storage subsystem 306. All read and write interface function calls 304 direct the commands, status, and data exchanged over bus 350 (typically a SCSI bus as noted above).

RAID control port LUN read and write support 308 is a portion of the control program operable within the RAID controller of the RAID storage subsystem 306 to receive and process commands relating to management and configuration of the RAID storage subsystem 306. RAID data LUNs read and write support 310 is another portion of the programs operable within the RAID controller to receive and process all commands relating to storage and retrieval of data in the disk array of the RAID storage subsystem 306. A particular read or write request is directed within the RAID storage subsystem 306 to the appropriate portion of the RAID controller control program in accordance with the LUN identified in the request. If the read or write request is directed to an LUN associated with storage capacity in the disk array, then RAID data LUNs read and write support 310 processes the request. If the read or write request is directed to the control port LUN, then RAID control port LUN read and write support 308 processes the request.

The methods of the present invention which provide support for the control port LUN may process requests generated by a plurality of RAID management programs operable on one or more attached host computers. As discussed below in additional detail, a unique tag ID value is used to associate multiple commands to a control port LUN. The tag ID is included in each read and write I/O function call as a logical block number. Since there is no physical disk array storage associated with the control port LUN, the tag ID field is transferred to the control port LUN as the logical block number in the read and write standard command formats (as specified for example by the SCSI specifications). The tag ID field (included as the logical block number in each read and write command sent to the control port LUN) therefore enables matching of the response to the generated request and directs the information to the proper waiting RAID management task on an attached host computer system.

RAID CONTROL PORT LUN SUPPORT METHODS

Figure 4:
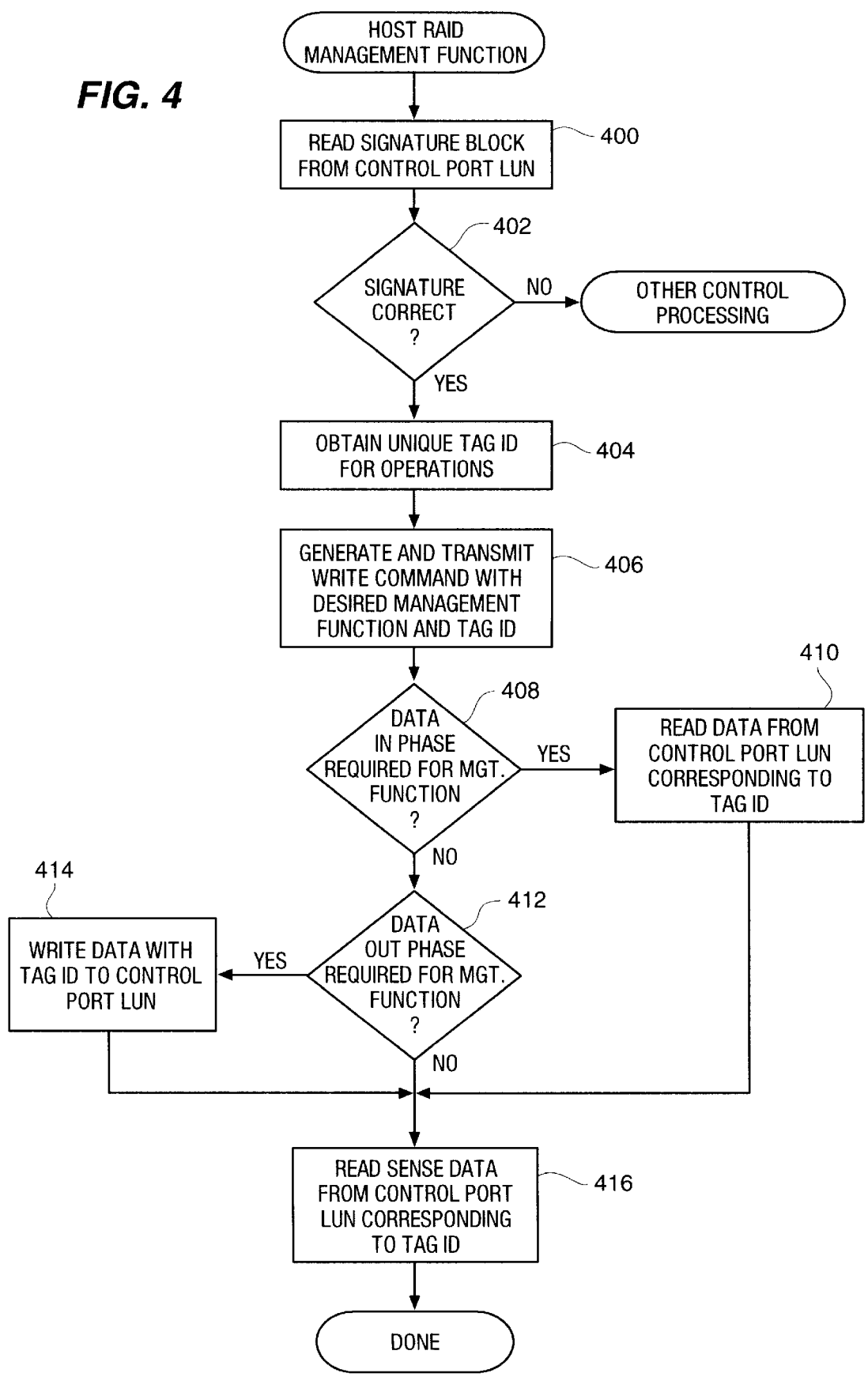
FIG. 4 is a flowchart describing the operation of a host computer based RAID management subsystem operable in connection with a RAID storage subsystem according to the methods of the present invention.
Figure 5:
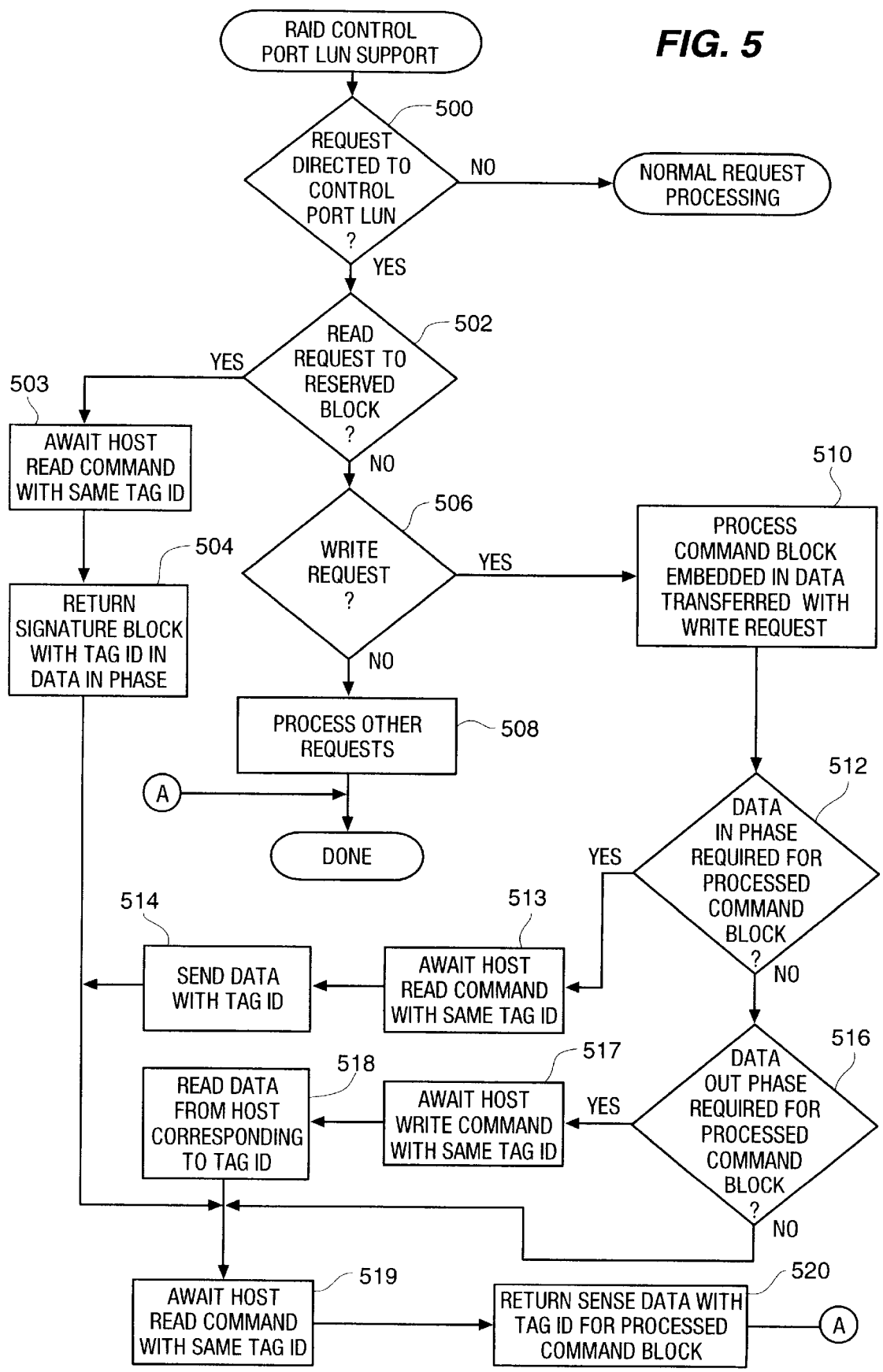
FIG. 5 is a flowchart describing the methods of the present invention operable within a RAID storage subsystem to enhance the portability of RAID management program on attached host computers.

FIGS. 4 and 5 are flowcharts describing methods operable on an attached host computer system (as shown in FIG. 4) and the methods of the present invention cooperative within the RAID controller (as show in FIG. 5) which enable the improved portability of RAID management programs on attached host computer systems.

FIG. 4 is a flowchart describing the operation of a RAID management program operable on an attached host computer in conjunction with a RAID storage subsystem which applies the methods of the present invention. As noted above, the methods of the present invention, operable within a RAID storage subsystem, enable the use of standard read and write function calls within a host computer based RAID management subsystem. Standard system read and write function calls are used to exchange management information between the RAID management program on a host computer system and the RAID storage subsystem. The prior art, by comparison, requires the use of non-standardized ioctl function calls by host based RAID management programs.

A signature data sequence may be read from a reserved logical block number of the control LUN to determine whether the LUN is in fact operable in accordance with the methods of the present invention. Though no physical storage capacity is associated with the control port LUN, a logical block number may none the less be transferred to the LUN in the parameters of the standard read or write command generated by the host computer system read or write function call. A reserved logical block number is used to indicate to the control port LUN that the signature block value is to be read.

Each management function performed by a RAID management host based program starts by generating and issuing a write command to the control port LUN. The data (command management information) associated with the write command includes the command block of the management function to be performed by the RAID storage subsystem. The tag ID value is also transferred to the control port LUN as part of the standard write command block to provide the required association of the command with the response or other commands. Any further data transfer required is then performed via a additional standard SCSI read and write commands as appropriate and as generated by host based RAID management read and write interface function calls. Further data transfer includes sense or status information regarding the result of the processing of the command management information and includes parameter information required to complete processing of the command management information.

The same tag ID value is embedded as the logical block number these subsequent SCSI read and write commands to assure that the commands and data are properly associated with the management function and originating write command. Finally, the RAID management program reads the sense data from the control port LUN to complete the management function command/data exchange. The read of any sense data is also performed using a system read function call to generate a standard read command having the tag ID value embedded therein as a logical block number.

Element 400 of FIG. 4 is first operable to read the signature data block from the control port LUN which serves to verify the operation of the control port LUN in accordance with the methods of the present invention. Element 402 is operable to determine whether the signature data block returned by the read operation of element 400 in fact identifies the LUN as on which is operable in accordance with the methods of the present invention. If so, processing continues with element 404. Otherwise, processing continues in accordance with the prior art to utilize non-standard, non-portable, ioctl function calls to manage the attached RAID storage subsystem.

Element 404 is operable to determine or otherwise obtain the tag ID value to be utilized by the particular instantiation of the RAID management program. The tag ID value, discussed in additional detail below, is transmitted as the logical block number in every read or write command generated for processing by the control port LUN. Since there is no physical disk array storage associated with the control port LUN, the tag ID value may be entered in that field for use in associating generated requests with corresponding responses. As is well known in the art, SCSI standard specifications of the read and write command blocks allow for a significant range of logical block numbers. The tag ID inserted in the logical block number field of each command may therefore serve to identify a large number of RAID management programs operable on one or more attached host computer systems.

Any of several well known techniques may be used to assign a tag ID value to a particular RAID management program so long as the technique results in a unique tag ID for each RAID management program simultaneously operable in conjunction with the RAID storage subsystem. For example, a centralized server process accessible to all RAID management host based programs may be utilized as a central control point for assigning and freeing tag ID values. The RAID storage subsystem itself may include a feature to return an unused tag ID value to a requesting RAID management program. As part of reading and verifying the signature block as discussed above, the RAID storage subsystem may include an unused tag ID value in the signature data returned to the RAID management program. One of ordinary skill in the art will readily recognize other equivalent methods to allocate and assign a unique tag ID field to each RAID management program operable on one or more host computer systems attached to the RAID storage subsystem.

Element 406 is then operable to generate and transmit a standard write command block to the control port LUN of the RAID storage subsystem. Any of the standard SCSI write command blocks may be used for this function so long as the tag ID may be embedded in place of a logical block number in the command block. One of ordinary skill in the art will readily recognize that the tag ID value may be inserted into other protocol command blocks so long as the management program on the host computer system is permitted to use system standard write function calls.

The command block includes a data portion that describes the actual management function to be performed. For example, a command may be embedded in the data portion of the write command which directs the control port LUN support to format another LUN associated with physical storage in the RAID subsystem. Likewise, administrative commands may be embedded in the data portion of the write command which direct the control port LUN to set or interrogate configuration options relating to geometry of the disk array or operation thereof. Any of the many well known RAID administrative commands may be so embedded in the data portion of the write command generated and transmitted by operation of element 406.

Element 408 is then operable to determine whether a DATA-IN SCSI phase is required to complete the administrative command embedded within the data portion of the write command generated and transmitted by operation of element 406. If a DATA-IN phase is required, element 410 is next operable to read the returned data using a SCSI DATA-IN phase operation (through a read function call to the operating system of the host computer). Administrative command embedded in the data portion of the write command may elicit reply data such as status or configuration information. A DATA-IN SCSI phase performed in response to the management program's read function call will retrieve any such data provided by the operation of the control port LUN. Processing then continues with element 416 following execution of the DATA-IN phase. If no DATA-IN phase is required to complete processing of the embedded administrative command, processing continues with element 412.

Element 412 is operable to determine whether a DATA-OUT SCSI phase is required to complete processing of the administrative command embedded within the data portion of the write command. If not, processing continues with element 416. If a DATA-OUT phase is required, element 414 is operable to execute the DATA-OUT (through a write function call to the operating system of the host computer). Some administrative commands embedded within the data portion of the write command may require additional data be supplied to complete the command processing. For example, to label a data storage LUN or to reconfigure the geometry of the RAID storage subsystem may require additional data beyond the administrative command block embedded within the write command generated by operation of element 406. Any such additional data is therefore supplied by operation of element 414 to transfer the data using a standard DATA-OUT SCSI phase executed by the operating system in response to a write function call. Processing then continues with element 416.

Element 416 is operable to read any sense data generated by completion of the embedded administrative command. Some administrative commands will always succeed, such as simple status inquiry commands, and therefore generate NO SENSE as a standard sense value response to completion of the inquiry command. Other administrative commands may succeed or fail depending upon the state of the physical storage devices in the data LUN. Such success or failure is indicated in the sense data returned by issuance of the read function call in element 416.

All elements of the RAID management methods discussed above with respect to FIG. 4 depend upon, first, the underlying support within the RAID storage subsystem for the control port LUN in accordance with the methods of the present invention as discussed below. There is no need for use of non-standardized ioctl interface function calls within the host computer system. Only well standardized read and write interface function calls need be utilized thereby improving the portability of the host based RAID management application programs. Secondly, the host based improvements depend upon the multi-threading features of the control port LUN support in the RAID storage subsystem implemented in the RAID controller control port LUN support by use of the unique tag ID in association with the steps of the method. Each read or write interface function call uses the unique tag ID to assure proper threading of the information exchanged between the RAID management programs and the control port LUN support in the RAID storage subsystem.

FIG. 5 is a flowchart describing the methods of the present invention operable with the controller of the RAID storage subsystem to provide the control port LUN support enabling the improved portability of the RAID management application programs. The RAID controller receives all I/O requests from attached host computer systems via the interconnecting SCSI bus. Each I/O request is inspected in the normal course of processing by the RAID controller to determine the destination LUN for the request. Requests directed to standard data storage LUNs are processed by other processing elements to perform normal data storage and retrieval from the destination LUN. Requests directed to the control port LUN are processed by the control port LUN support methods of the present invention to allow RAID management programs operable on attached host computers to perform required administration using standard read and write interface function calls.

The control port LUN support methods within the RAID controller provide support for the RAID management programs on attached host computer systems complement the structure and operations discussed above with respect to FIG. 4. An initial read request from a host computer requesting the signature block data system is processed by returning the requested signature information to notify the host of the RAID subsystem's support for the control port LUN capability. A write request indicates that a RAID management program operable on an attached host computer system is requesting the execution of an administrative command (another SCSI command for example) which is embedded within the data portion of the received write command. The embedded administrative command may require additional DATA-IN or DATA-OUT SCSI bus phases to complete the processing of the embedded command. Any such required additional data phases are generated by the host based RAID management program through standard read and write interface function calls and are then processed by the methods of the present invention to complete the embedded RAID management request. Finally, a sense status is returned to the requesting RAID management program to complete processing of the received write command. All data so exchanged is embedded within standard read and write SCSI commands generated by, and transmitted from, host computer based RAID management read and write interface function calls. The tag ID field is used as the logical block number within the standard read and write SCSI commands to associate replies or data transfers relating to other read and write requests with the originating I/O request and management program.

In particular, element 500 of FIG. 5 is first operable in response to receipt of a SCSI command at the RAID control of the storage subsystem. Element 500 inspects the received command to determine whether the command is directed to the control port LUN as distinct from standard LUNs associated with physical storage capacity in the disk array. If the received command is directed to a data storage LUN, other well known processing unrelated to the methods of the present invention are operable to complete processing of the received command. If instead the received command is directed to the control port LUN, element 502 is next operable to determine whether the request is a read request to retrieve the signature block. As noted above, the signature block comprises a unique data sequence which serves to identify the RAID storage subsystem to the RAID management program as a storage device which supports the control port LUN methods of the present invention. If the received request is a read request of the signature block, processing continues with element 503 to await a read request with the same tag ID and then element 504 to return the signature block data along with the received tag ID. Processing then continues with element 519 to complete processing of the received read request.

If element 502 determines that the received command is not a read request, element 506 is next operable to determine whether the received command is a write request. If not, processing of other commands is completed by operation of element 508. Element 508 performs any processing appropriate to respond to the received command. Standard test and inquiry commands are supported by the control port LUN to satisfy compatibility requirements of device drivers and other system programs which test SCSI devices and associated LUNs and exchange status information therewith.

If element 506 determines that a received command is a write request, processing continues with element 510 to analyze the embedded administrative command and to perform any necessary processing therefor. As discussed above, any SCSI command useful to the RAID management program operating on an attached host computer system may be embedded within the data associated with the received write command. This permits any SCSI command sequence to be performed within the RAID storage subsystem on behalf of the RAID management host computer based program while requiring no more than standard read and write interface function calls within the host computer system. The administrative command embedded within the data portion of the received write command is completely executed as required by operation of element 510. Such administrative commands may include, for example, formatting or labeling of a data storage LUN, reconfiguration of the geometry of the disk array LUNs, inquiring as to status and configuration or operating parameters of a LUN, etc. Following completion of processing for the received, embedded administrative command, processing continues with element 512.

Element 512 is next operable to determine whether a DATA-IN SCSI phase is required to satisfy a pending read request by the RAID management program following completion of the embedded administrative command. If the administrative command generates return data, such as status or configuration information for example, then the RAID management program will await the return of the requested data by issuing a standard read interface function call. Element 512 is therefore operable to determine if the processed administrative command has generated such information ready for return to the host computer system. If so, processing continues with element 513 to await a read request with the originating request's tag ID then with element 514 to transmit the generated data to the waiting RAID management program on an attached host computer system. The tag ID value received with the write command initiating this processing is returned with the generated data to associate the data with the requesting management program. Processing then continues with element 519 to complete processing of the received write request.

If element 512 determines that processing of the embedded administrative command does not require a SCSI DATA-IN phase to return generated data, element 516 is next operable to determine whether a SCSI DATA-OUT phase is required to complete processing of the embedded administrative command. An embedded administrative command may require additional data to complete processing. For example, an embedded administrative command may require the transmission of new configuration or operation parameters from the RAID management program on an attached host computer. The RAID management program will issue subsequent write requests to supply the requisite data after issuing the write command which embeds the administrative command. Element 516 therefore determines whether the particular embedded administrative just processed requires such additional data. If not, processing continues with element 519 to complete processing of the received write request. If so, element 517 is next operable to await a host computer write request having the originating request's tag ID then any required data is received from the attached host computer system by operation of element 518. The tag ID transferred with the additional data in the DATA-OUT SCSI phase is used to associate the additional data with the write request which originated the processing. Processing then continues with element 519 to complete the received write request.

Finally, any sense data indicative of the results of processing the embedded command management information is returned to the host computer. Element 519 awaits a host computer read request having the same tag ID as the originating I/O request. Once the host so indicates its readiness to receive sense data, element 520 is operable to complete the processing of a received read or write request by returning appropriate SCSI sense data in response to the processed, embedded, administrative command. As with other exchanges of data or commands in the methods of the present invention, the tag ID value received with the original read or write request is returned to associate the sense data returned with the originating request. The RAID management program, following transmission of the embedded administrative command using a write interface function call and following and additional read or write function calls associated with additional data transfers required by the administrative command, awaits the return of sense data by issuing another read interface is function call. Element 520 therefore serves to satisfy the final read function call of the RAID management program relating to the processing of a single embedded administrative command. Processing is then completed for the embedded, administrative command or the signature block read command and the RAID controller awaits receipt of another SCSI command for processing.

EMBEDDED ADMINISTRATIVE COMMANDS AND DATA

As discussed above with respect to the methods of the present invention, administrative commands are directed to the control port LUN of the RAID storage subsystem by embedding them within the data portion of standard SCSI read and write commands. The standard read and write SCSI commands are generated by a RAID management program operable on an attached host computer by use of standard read and write interface function calls thereby avoiding complexities inherent in use of non-standard ioctl interface function calls. Such commands may be embedded in a buffer transmitted as data in association with a standard SCSI write command. Data required to process the embedded command is also exchanged between the RAID management program and the control port LUN support in the RAID storage subsystem using standard SCSI read and write commands generated by standard read and write interface function calls on the host computer systems.

Figure 6:
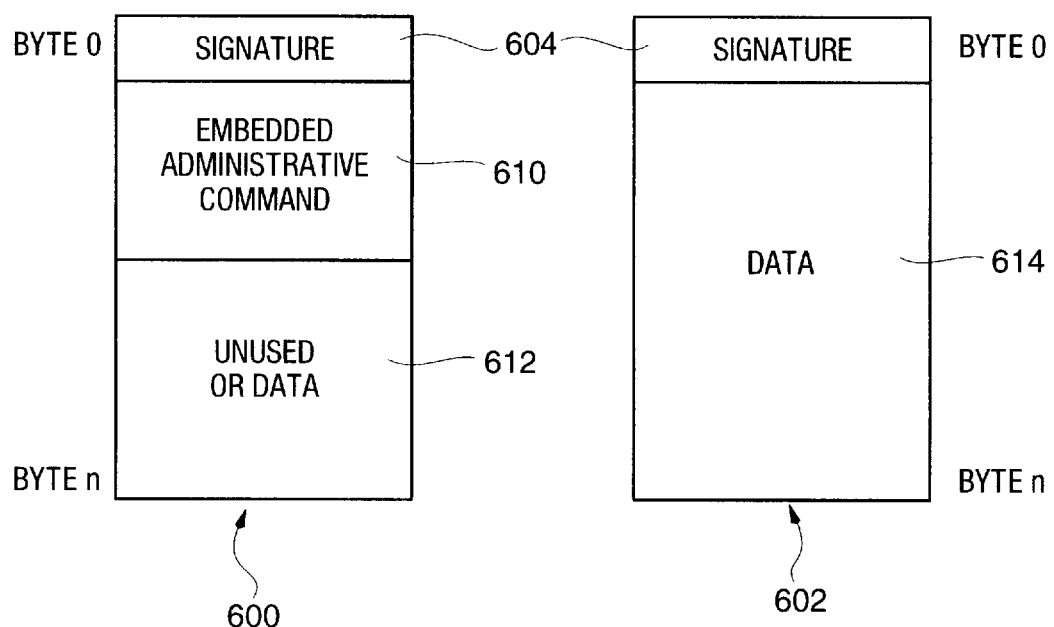
FIG. 6 is a block diagram representative of the structure of data buffers associated with the exchange of embedded commands and data between the control port LUN support methods of the present invention and host computer based RAID management programs.

FIG. 6 is a block diagram of such buffers used to exchange data and embedded administrative commands between the RAID management programs and the RAID storage subsystem operating in accordance with the methods of the present invention. Buffer 600 exemplifies a data buffer associated with a standard SCSI write command used to transfer an embedded administrative command 610 to the control port LUN. The buffer includes the signature block 604 for validation of the availability of control port LUN support as noted above. Unused section 612 may include further parametric data associated with the embedded administrative commands.

Buffer 602 describes the structure of a buffer used to exchange data between the RAID management program and the RAID controller control port LUN. As noted above, processing of certain embedded administrative commands may require exchanging additional data between the RAID storage subsystem and the host computer system. Any such additional data is exchanged by subsequent standard read and write interface function calls following the write function call which transmits the embedded administrative command. The additional function calls generate additional SCSI standard read or write command blocks as required having data associated therewith in accordance with buffer 602. In particular, the buffer 602 includes the signature block 604 for validation of the availability of control port LUN support as noted above.

One of ordinary skill in the art will readily recognize that several equivalent structures may be utilized to exchange embedded administrative commands and associated data buffers between the RAID management host based programs and the RAID storage subsystem's control port LUN. FIG. 6 is intended only as exemplary of one possible structure of buffers used for this command and data exchange.

TAG ID—MULTI-THREADING

As noted above, a tag ID value is associated with every data and command exchanged between the RAID management program and the control port LUN of the RAID storage subsystem. As is well known in SCSI bus interfacing, a plurality of attached host computers may communicate with the RAID storage subsystem both for the storage and retrieval of data and for purposes of managing the configuration an operation thereof. The tag ID value is generated or determined in a manner to assure that each RAID management program uses a unique tag value for its interaction with the control port LUN. The tag ID serves as a thread identifier to permit multi-threaded operation of the control port LUN. Several administrative commands may be issued simultaneously by any of several RAID management programs operable on attached host computer systems. Each administrative command may require differing amounts of time to complete depending upon the specific command requirements. For example, a command to format a data LUN or commands which serve to restore contents of a failed drive on a "hot spare" may require significantly more processing time than a simple status inquiry command. Multi-threading (multi-tasking) operation of the control port LUN support methods of the present invention permit the RAID storage subsystem to concurrently service many such embedded administrative commands and to associate any required exchange of data with the appropriate host computer based RAID management program. Each data exchange (subsequent read or write following the write function call which generates the embedded administrative command) includes the tag ID assigned to the RAID management program. The data exchanges associated therewith therefore are readily identifiable as associated with the corresponding RAID management program.

One of ordinary skill in the art will readily recognize that the methods of the present invention as depicted in FIGS. 4 and 5 and as discussed above represent the processing of a single thread. Well known software methods and programming techniques to implement multi-tasking in a host computer system or in the processing components of the RAID controller within a RAID storage subsystem may be applied to concurrently process read and write commands in the control port LUN from a plurality of RAID management programs operable in one or more attached host computer systems.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for exchanging management information between a RAID storage subsystem and an attached host computer system comprising the steps of:

generating a first data buffer having command management information embedded therein, wherein said command management information comprises control commands for the control of said RAID storage subsystem including configuration control commands to reconfigure operating parameters of said RAID storage subsystem;

invoking a first write function call on said host computer system to send said first data buffer to a control port associated with said RAID storage subsystem; and invoking a first read function call on said host computer system to receive status information responsive to execution of said control commands from said control port associated with said RAID storage subsystem in response to a write function call.

2. The method of claim 1 further comprising the steps of:

associating a tag ID value with said first write function call; and associating said tag ID value with said first read function call.

3. The method of claim 2 wherein said tag ID value is stored in a logical block number field associated with said first write function call and with said first read function call.

4. The method of claim 1 further comprising the steps of:

generating a second data buffer having parameter information relating to said command management information; and invoking a second write function call on said host computer system to send said second data buffer to said control port in response to the sending of said first data buffer.

5. The method of claim 4 further comprising the steps of:

associating a tag ID value with said first write function call;

associating said tag ID value with said second write function call; and associating said tag ID value with said first read function call.

6. The method of claim 5 wherein said tag ID value is stored in a logical block number field associated with said first write function call and with said first read function call and with said second write function call.

7. The method of claim 1 further comprising the step of:

invoking a second read function call on said host computer system to receive parameter information from said RAID storage subsystem in response to the sending of said first data buffer.

8. The method of claim 7 further comprising the steps of:

associating a tag ID value with said first write function call;

associating said tag ID value with said second function call; and associating said tag ID value with said first read function call.

9. The method of claim 8 wherein said tag ID value is stored in a logical block number field associated with said first write function call and with said first read function call and with said second read function call.

10. The method of claim 1 wherein said control port is identified by a logical unit number associated with said RAID storage subsystem.

11. The method of claim 1 further comprising the step of:

invoking a read function call on said host computer system to receive a predefined signature block verifying operation of said control port in said RAID storage subsystem.

12. The method of claim 11 wherein said first data buffer includes said predefined signature block to verify operation of said control port in said RAID storage subsystem.

13. A method operable within a RAID storage subsystem for supporting the exchange of management information using read and write commands from an attached host computer comprising the steps of:

receiving from said host computer system a first write command having command management information associated therewith, wherein said command management information comprises control commands for the control of said RAID storage subsystem including configuration control commands to reconfigure operating parameters of said RAID storage subsystem;

processing said command management information to manage the operation of said RAID storage subsystem responsive to receipt of said first write command;

awaiting receipt of a first read command from said host computer system in response to a write function call; and sending sense information regarding the result of execution of said control commands responsive to the receipt of said first read command.

14. The method of claim 13, wherein a tag ID value is associated with said first write command and a tag ID value is associated with said first read command, and wherein the step of awaiting receipt of said first read command includes the step of:

awaiting receipt of said first read command from said host computer system having a tag ID value associated therewith equal to the tag ID value associated with said first write command.

15. The method of claim 13 further comprising the step of:

awaiting receipt of a second write command from said host computer system having parameter information associated with said management information.

16. The method of claim 15, wherein a tag ID value is associated with said first write command and a tag ID value is associated with said first read command and a tag ID value is associated with said second write command, and wherein the step of awaiting receipt of said first read command includes the step of:

awaiting receipt of said first read command from said host computer system having a tag ID value associated therewith equal to the tag ID value associated with said first write command, and wherein the step of awaiting said second write command includes the step of:

awaiting receipt of said second write command from said host computer system having a tag ID value associated therewith equal to the tag ID value associated with said first write command.

17. The method of claim 13 further comprising the step of:

awaiting receipt of a second read command from said host computer system.

18. The method of claim 17, wherein a tag ID value is associated with said first write command and a tag ID value is associated with said first read command and a tag ID value is associated with said second read command, and wherein the step of awaiting receipt of said first read command includes the step of:

awaiting receipt of said first read command having a tag ID value associated therewith equal to the tag ID value associated with said first write command, and wherein the step of awaiting said second read command includes the step of:

awaiting receipt of said second read command from said host computer system having a tag ID value associated therewith equal to the tag ID value associated with said first write command.

19. A program storage device readable by a computer, tangibly embodying a program or instructions executable by the computer to perform the method steps for exchanging management information between a RAID storage subsystem and an attached host computer system, said method steps comprising:

generating a first data buffer having command management information embedded therein, wherein said command management information comprises control commands for the control of said RAID storage subsystem including configuration control commands to reconfigure operating parameters of said RAID storage subsystem;

invoking a first write function call on said host computer system to send said first data buffer to a control port associated with said RAID storage subsystem; and invoking a first read function call on said host computer system to receive status information responsive to execution of said control commands from said control port associated with said RAID storage subsystem in response to a write function call.

20. The program storage device of claim 19 wherein the method steps further comprise the steps of:

associating a tag ID value with said first write function call; and associating said tag ID value with said first read function call.

21. The program storage device of claim 20 wherein said tag ID value is stored in a logical block number field associated with said first write function call and with said first read function call.

22. The program storage device of claim 19 wherein the method steps further comprise the steps of:

generating a second data buffer having parameter information relating to said command management information; and invoking a second write function call on said host computer system to send said second data buffer to said control port in response to the sending of said first data buffer.

23. The program storage device of claim 22 wherein the method steps further comprise the steps of:

associating a tag ID value with said first write function call;

associating said tag ID value with said second write function call; and associating said tag ID value with said first read function call.

24. The program storage device of claim 23 wherein said tag ID value is stored in a logical block number field associated with said first write function call and with said first read function call and with said second write function call.

25. The program storage device of claim 19 wherein the method steps further comprise the step of:

invoking a second read function call on said host computer system to receive parameter information from said RAID storage subsystem in response to the sending of said first data buffer.

26. The program storage device of claim 25 wherein the method steps further comprise the steps of:

associating a tag ID value with said first write function call;

associating said tag ID value with said second function call; and associating said tag ID value with said first read function call.

27. The program storage device of claim 26 wherein said tag ID value is stored in a logical block number field associated with said first write function call and with said first read function call and with said second read function call.

28. The program storage device of claim 19 wherein said control port is identified by a logical unit number associated with said RAID storage subsystem.

29. The program storage device of claim 19 wherein the method steps further comprise the step of:

invoking a read function call on said host computer system to receive a predefined signature block verifying operation of said control port in said RAID storage subsystem.

30. The program storage device of claim 29 wherein said first data buffer includes said predefined signature block to verify operation of said control port in said RAID storage subsystem.

* * * * *